(12) United States Patent
Ghosh et al.

(10) Patent No.: US 12,494,248 B2
(45) Date of Patent: Dec. 9, 2025

(54) MEMORY POWER CONTROL UNIT

(71) Applicant: NXP B.V., Eindhoven (NL)

(72) Inventors: Prokash Ghosh, Mogra (IN); Jyotirmoy Ghosh, Kolkata (IN); Glenn Charles Abeln, Buda, TX (US); Dwarka Prasad, Noida (IN); Rajat Kohli, Bangalore (IN); Jainendra Singh, Bangalore (IN); Jwalant Kumar Mishra, Bangalore (IN)

(73) Assignee: NXP B.V. (NL)

( * ) Notice: Subject to any disclaimer, the term of this patent is extended or adjusted under 35 U.S.C. 154(b) by 133 days.

(21) Appl. No.: 18/535,443

(22) Filed: Dec. 11, 2023

(65) Prior Publication Data

US 2024/0203480 A1 Jun. 20, 2024

(30) Foreign Application Priority Data

Dec. 16, 2022 (IN) .............................. 202221072985

(51) Int. Cl.
*G11C 11/4078* (2006.01)
*G11C 11/4074* (2006.01)
*G11C 11/4076* (2006.01)

(52) U.S. Cl.
CPC ...... *G11C 11/4078* (2013.01); *G11C 11/4074* (2013.01); *G11C 11/4076* (2013.01)

(58) Field of Classification Search
CPC ............ G11C 11/401–4099; G11C 11/41–419
See application file for complete search history.

(56) References Cited

U.S. PATENT DOCUMENTS

| | | | |
|---|---|---|---|
| 8,656,185 | B2 | 2/2014 | Furusawa et al. |
| 9,608,827 | B1 | 3/2017 | Trimberger |
| 2016/0379705 | A1 | 12/2016 | Lu et al. |
| 2018/0108386 | A1* | 4/2018 | Elbaum .................... G11C 7/24 |

OTHER PUBLICATIONS

Skorobogatov, Sergei, "Hardware Security Implications of Reliability, Remanence, and Recovery in Embedded Memory," Journal of Hardware and Systems Security, Sep. 27, 2018, 8 pages.
(Continued)

*Primary Examiner* — Alfredo Bermudez Lozada

(57) ABSTRACT

A memory power control unit, MPCU, is provided for preventing unauthorised access to data stored in a volatile memory, the MPCU comprising a power controller comprising an input configured to receive a signal from a tamper detection circuit, a first supply input configured 5 to receive a first supply voltage, a first reference input configured to receive a first reference voltage, a supply output configured to output a supply voltage to the volatile memory, a reference output configured to output a reference voltage to the volatile memory, wherein, in response to receipt of a signal at the input indicative of an attempt to tamper with the volatile memory, the power controller is configured to output a reduced supply voltage via the supply 10 output for a first predetermined time period, wherein the reduced supply voltage is less than the first supply voltage.

18 Claims, 8 Drawing Sheets

(56) References Cited

OTHER PUBLICATIONS

Wenjing et al., "Novel Security Strategies for SRAM in Powered-off State to Resist Physical Attack," Proceedings of the 2009 12th International Symposium on Integrated Circuits, Dec. 14-16, 2009, 4 pages.
Noel et al., "A Near-Instantaneous and Non-Invasive Erasure Design Technique to Protect Sensitive Data Stored in Secure SRAMs," IEEE 47th European Solid State Circuits Conference, Sep. 13, 2021, pp. 455-458.
Patsakis, Constantinos, "RSA private key reconstruction from random bits using SAT solvers," Distributed Systems Group, School of Computer Science and Statistics, Trinity College, Dublin, Ireland, May 7, 2013: revised, downloaded from https://eprint.iacr.org/2013/026.pdf on Jun. 24, 2025, 20 pages.
Skorobogatov, Sergei, "Low temperature data remanence in static RAM," Technical Report, UCAM-CL-TR-536 ISSN 1476-2986, University of Cambridge, Computer Laboratory, Jun. 2002, 9 pages.
CMVP, "Implementation guidance for fips-140-2 and the cryptographic module validation program," in National Institute of Standards and Technology, Dept. of commerce, USA, Initial Release: Mar. 28, 2003; Last Update: Oct. 30, 2023, 298 pages.
Srivastava et al., "An Efficient Memory Zeroization Technique Under Side-Channel Attacks" 2019 32nd International Conference on VLSI Design and 2019 18th International Conference on Embedded Systems (VLSID), 6 pages.
Cakir et al., "6T SRAM and 3T DRAM Data Retention and Remanence Characterization in 65nm bulk CMOS," Department of Electrical and Computer Engineering, Carnegie Mellon University, Pittsburgh, Pennsylvania, Proc. of the IEEE 2012 Custom Integrated Circuits Conference, pp. 1-4, 2012.
Department of Commerce, "FIPS Pub 140-3, Federal Information Processing Standards Publication, (Supersedes FIPS Pub 140-2), Security Requirements for Cryptographic Modules," Mar. 22, 2019, 11 pages.

* cited by examiner

MEMORY POWER CONTROL UNIT

CROSS-REFERENCE TO RELATED APPLICATIONS

This application claims the priority under 35 U.S.C. § 119 of India patent application No. 202221072985, filed on 16 Dec. 2022, the contents of which are incorporated by reference herein in its entirety.

BACKGROUND

Field of the Disclosure

The present specification relates to a memory power control unit for controlling the power supplied to a volatile memory. In particular, this disclosure provides a memory power control unit and method for preventing unauthorised access to data stored in a volatile memory.

Description of the Related Art

The data remanence property of random-access memory (RAM) means that some memory contents are retained for a time period following a power switch-off. This time period can be as long as a few minutes. This data remanence effect creates serious security vulnerabilities in memory systems.

Researchers have demonstrated that this data remanence effect can be exploited by hackers to at least partially recover residual data content of memory in a power cut condition. This residual data can be recovered using simple, non-destructive techniques that require only momentary access to the machine. At low temperature the data remanence time increases substantially, and it is known for hackers to try to recover the data of operational memory using physical attacks like a cold boot attack or volt boot, etc, wherein a computer is rebooted at low temperatures. In such attacks, a hacker can recover digital keys, passwords, authentication credentials, secrets etc from volatile memory (RAM).

SUMMARY

Aspects of the present disclosure are set out in the accompanying independent and dependent claims. Combinations of features from the dependent claims may be combined with features of the independent claims as appropriate and not merely as explicitly set out in the claims.

In a first aspect of the present disclosure, there is provided a memory power control unit, MPCU, for preventing unauthorised access to data stored in a volatile memory, the MPCU comprising a power controller comprising an input configured to receive a signal from a tamper detection circuit or a reset controller, a first supply input configured to receive a first supply voltage, a first reference input configured to receive a first reference voltage, a supply output configured to output a supply voltage to the volatile memory, a reference output configured to output a reference voltage to the volatile memory, wherein, in response to receipt of a signal at the input indicative of an attempt to tamper with the volatile memory, the power controller is configured to output a reduced supply voltage via the supply output for a first predetermined time period, wherein the reduced supply voltage is less than the first supply voltage.

Optionally, the first reference voltage is ground.

Optionally, the first predetermined time period is of the order of microseconds or lower.

The power controller is configured to control the power supplied to the volatile memory.

Optionally, the memory power control unit further comprise a timer circuit, wherein the timer circuit is configured to set the first predetermined time period.

Optionally, the reduced supply voltage may be ground, or 0 V.

Optionally, the reduced supply voltage may be the first supply voltage multiplied by k, wherein k is between 0 and 1.

Optionally, the timer circuit comprises a capacitor.

Optionally, the power controller comprises a switching device. The switching device may be configured to selectively connect the supply output to either the first supply input or a second supply input, wherein the second supply input is configured to receive the reduced supply voltage.

Optionally, the power controller comprises a logic circuit.

Optionally, the switching device may form part of the logic circuit. Optionally, the switching device may be coupled to the logic circuit.

In response to receipt of a signal indicative of an attempt to tamper with the volatile memory the timer circuit may be configured to output a discharge voltage from the capacitor. The logic circuit may be configured to compare the discharge voltage to a predetermined threshold. Until the discharge voltage reaches the predetermined threshold, the logic circuit is configured to provide the reduced supply voltage to the supply output.

Thus, the reduced supply voltage may be output for the duration of time that the discharge voltage exceeds the predetermined threshold. Accordingly, the discharge voltage and the predetermined threshold are selected to control the first predetermined time period.

The terms 'predetermined threshold' and 'predetermined limit' may be used interchangeably in the present disclosure.

Optionally, the logic circuit comprises a switching device. The switching device may be configured to selectively connect the supply output to either the first supply input or a second supply input, wherein the second supply input is configured to receive the reduced supply voltage.

The switching device may be a switch.

The reduced supply voltage may be provided by a power supply module, which may be external to the MPCU.

Optionally, in response to receipt of a signal at the input indicative of an attempt to tamper with the volatile memory, the power controller may be configured to output an increased reference voltage via the reference output for a second predetermined time period, wherein the increased reference voltage is higher than the first reference voltage but less than or equal to the first supply voltage.

Optionally, the first predetermined time period is greater than or equal to the second predetermined time period.

The second predetermined time period may be of the order of microseconds or lower.

The MPCU may comprise a timer circuit, wherein the timer circuit is configured to set the first predetermined time period and the second predetermined time period. Thus, a single timer circuit may define both the first and second time periods. The timer circuit may be as defined above.

The timer circuit may be configured to output a discharge voltage from a capacitor.

The power controller may comprise a logic circuit. The logic circuit may be configured to compare the discharge voltage to a predetermined threshold. The logic circuit may be configured to provide the increased reference voltage to the reference output and provide the reduced supply voltage to the supply output until the discharge voltage reaches the predetermined threshold.

Optionally, the logic circuit is configured to compare the discharge voltage to a first predetermined threshold, wherein the logic circuit is configured to provide the reduced supply voltage to the supply output until the discharge voltage reaches the first predetermined threshold.

Optionally, the logic circuit is configured to compare the discharge voltage to a second predetermined threshold, wherein the logic circuit is configured to provide the increased reference voltage to the reference output until the discharge voltage reaches the second predetermined threshold.

The second predetermined threshold may be greater than or equal to the first predetermined threshold.

Thus, the reduced supply voltage may be output for the duration of time that the discharge voltage exceeds the first predetermined threshold. The increased reference voltage may be output for the duration of time that the discharge voltage exceeds the second predetermined threshold Accordingly, the discharge voltage and the first and second predetermined threshold can be selected to control the first predetermined time period and the second predetermined time period.

Optionally, the logic circuit comprises a switching device. The switching device may be configured to selectively connect the supply output to either the first supply input or a second supply input, wherein the second supply input is configured to receive the reduced supply voltage. The switching device may also be configured to selectively connect the reference output to either the first reference input or a second reference input, wherein the second reference input is configured to receive the increased reference voltage.

Optionally, the MPCU may comprise a first timer circuit configured to set the first predetermined time period and a second timer circuit configured to set the second predetermined time period.

Optionally, the power controller comprises a first logic circuit coupled to the first timer circuit, and a second logic circuit coupled to the second timer circuit.

Each timer circuit may comprise a respective capacitor. The capacitors may be of different values.

Optionally, in response to receipt of a signal indicative of an attempt to tamper with the volatile memory, each timer circuit is configured to output a respective discharge voltage from the respective capacitor. The respective logic circuit may be configured to receive the discharge voltage from the respective timer circuit.

The first logic circuit may be configured to compare the discharge voltage from the first timer circuit to a first predetermined threshold. The first logic circuit may be configured to provide the reduced supply voltage to the supply output until the discharge voltage reaches the first predetermined threshold.

The second logic circuit may be configured to compare the discharge voltage from the second timer circuit to a second predetermined threshold. The second logic circuit may be configured to provide the increased reference voltage to the reference output until the discharge voltage reaches the second predetermined threshold.

The first logic circuit may comprise a first switching device. The first switching device may be configured to selectively connect the supply output to either the first supply input or a second supply input, wherein the second supply input is configured to receive the reduced supply voltage.

The second logic circuit may comprise a second switching device. The second switching device may be configured to selectively connect the reference output to either the first reference input or a second reference input, wherein the second reference input is configured to receive the increased reference voltage.

The increased reference voltage may be provided by a power supply module, which may be external to the MPCU.

Optionally, each timer circuit comprises a first input configured to receive a signal from the tamper detection circuit and a second input configured to receive a charging voltage, and an output.

Optionally each timer circuit comprises a transistor coupled to both the first input and the second input, wherein the capacitor is coupled to an output of the transistor. Optionally, the transistor is a MOSFET transistor.

Equivalently, the transistor may be a switching device, such as a pull-up switch.

In response to receipt of a signal at the first input indicative of an attempt to tamper with the volatile memory, the transistor may be configured to charge and then discharge the capacitor to provide the discharge voltage to the output of the timer circuit.

In response to receipt of a signal at the first input indicative of an attempt to tamper with the volatile memory, the transistor may be configured to couple the capacitor to the second input to charge the capacitor, prior to discharging the capacitor.

Optionally, the capacitor may be a trimmable capacitor.

Optionally, each timer circuit further comprises a resistor coupled between the output of the transistor and ground. The resistor may be a weak pull down resistor. The resistor may be configured to ensure that the capacitor is not charged until the first input receives a signal indicative of an attempt to tamper with the volatile memory. Thus, the resistor may be selected to ensure that the capacitor remains in an uncharged state until a potential security violation is detected.

In a second aspect of the present disclosure, there is provided an electronic device comprising the memory power control unit of any embodiment or example of the first aspect of the disclosure, a volatile memory coupled to both the supply output and the reference output of the memory power control unit and a tamper detection circuit coupled to the input of the memory power control unit.

Optionally, the tamper detection circuit is configured to detect a reboot of the electronic device and output a signal indicative of an attempt to tamper with the volatile memory in response to detecting a reboot of the electronic device.

Optionally, the tamper detection circuit may be a reset controller.

Optionally, the tamper detection circuit is configured to detect a reboot of the electronic device at a temperature below a predetermined threshold. The tamper detection circuit may output a signal indicative of an attempt to tamper with the volatile memory in response to detecting a reboot of the electronic device at a temperature below the predetermined threshold.

In a third aspect, the present invention provides a method of preventing unauthorised access to data stored in a volatile memory, the method comprising providing a power controller, the power controller comprising an input, a first supply input configured to receive a first supply voltage, a first reference input configured to receive a first reference voltage, a supply output configured to output a supply voltage to the volatile memory, a reference output configured to output a reference voltage to the volatile memory, receiving, at the input of the power controller, a signal indicative of an attempt to tamper with the volatile memory, and outputting for a first predetermined time period a reduced supply voltage via the supply output, wherein the reduced supply voltage is less than the first supply voltage.

Optionally, in response to receipt of a signal at the input indicative of an attempt to tamper with the volatile memory, the method further includes outputting an increased reference voltage via the reference output for a second predetermined time period, wherein the increased reference voltage is higher than the first reference voltage but less than or equal to the first supply voltage.

Optionally, the first predetermined time period is greater than or equal to the second predetermined time period.

It will be appreciated that any embodiment of the first and/or second aspects of the disclosure apply equally to the third aspect of the disclosure.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION OF EMBODIMENTS

Embodiments of this disclosure are described in the following with reference to the accompanying drawings.

Figure 1:
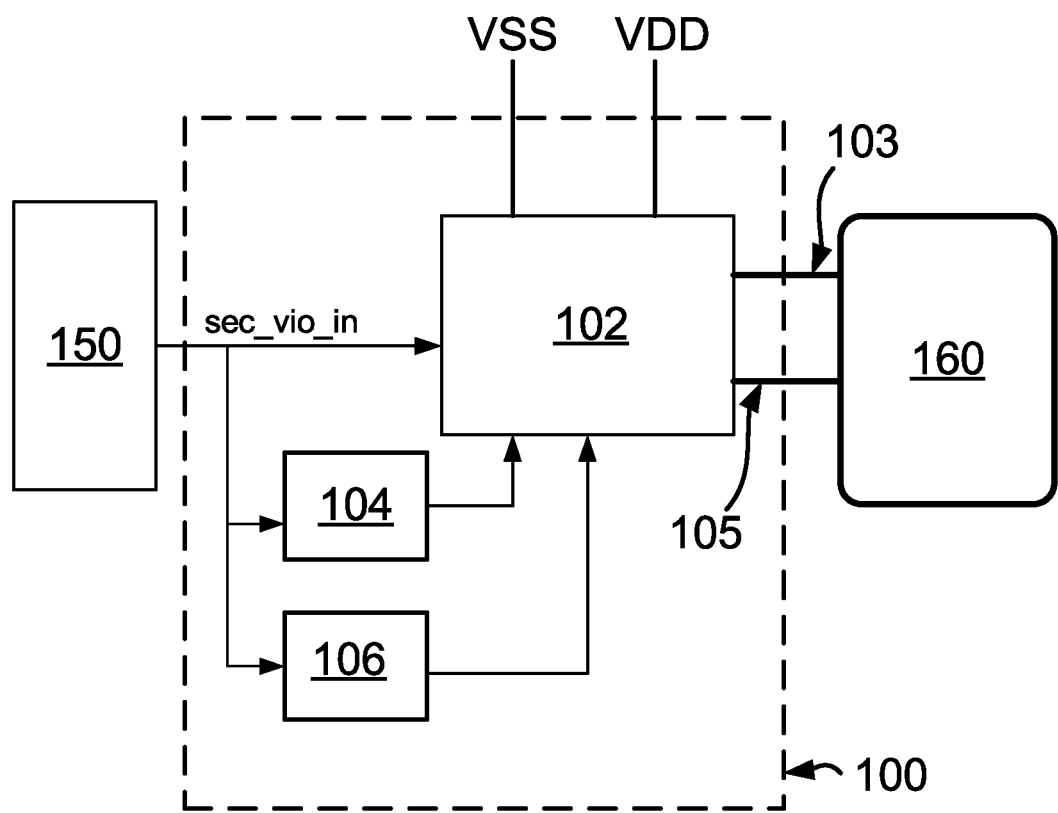
FIG. 1 is a schematic illustration of a portion of an electronic device according to an embodiment of this disclosure.
Figure 8:
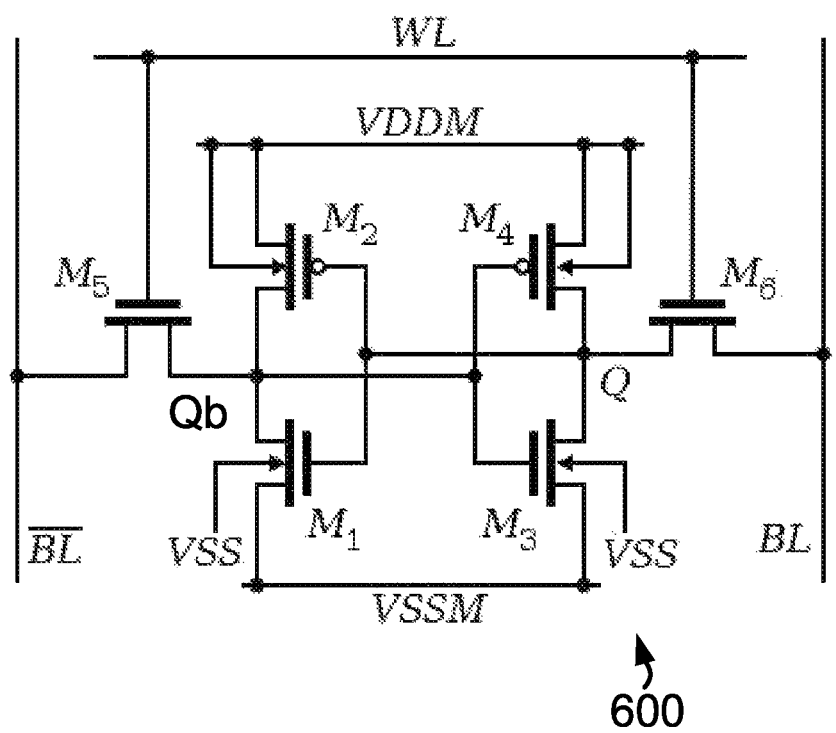
FIG. 8 shows an example of an SRAM cell forming part of a volatile memory according to an embodiment of the present disclosure.

FIG. 1 is a block diagram showing a portion of an electronic device according to an embodiment of the present disclosure. The electronic device comprises a memory power control unit (MPCU) 100, a tamper detection circuit 150 and a volatile memory 160. The volatile memory 160 may be referred to as a memory array. The volatile memory 160 may be a static RAM (SRAM) array comprising a plurality of SRAM bit-cells 600 as shown in FIG. 8. However, this disclosure is equally applicable to DRAMs or any type of volatile memory.

The tamper detection circuit 150 may be referred to as a security monitor unit, or a reset controller. The tamper detection circuit 150 is configured to output a signal (sec_vio_in) to the MPCU 100 if an attempt to tamper with the volatile memory 160 is detected. A variety of suitable tamper detection circuits 150 could be used.

The tamper detection circuit 150 may be configured to detect when the electronic device is rebooted. A reboot is when an electronic device is restarted using hardware (e.g., a power button) instead of software. Thus, the signal (sec_vio_in) indicative of a security violation may be output in response to detecting a reboot of the electronic device. In some embodiments, the tamper detection circuit 150 may be more specifically configured to detect a cold reboot of the electronic device. Thus, the tamper detection circuit may output a signal (sec_vio_in) indicative of a security violation if a reboot of the electronic device is detected at a temperature that is below a predefined temperature limit.

In the embodiment shown in FIG. 1, the MPCU 100 comprises a power controller 102, a first timer circuit 104 and a second timer circuit 106. In other embodiments, only a single timer circuit may be provided. In some embodiments, the timer circuit(s) may be internal to the power controller 102.

The power controller 102 controls the power supplied to the volatile memory 160. The power controller 102 comprises an input configured to receive a signal from the tamper detection circuit 150. The power controller 102 also comprises a first supply input configured to receive a first supply voltage VDD and a first reference input configured to receive a first reference voltage VSS. A supply output 103 is coupled from the power controller 102 to the volatile memory 160 to output a supply voltage VDDM to the volatile memory 160. A reference output 105 is coupled from the power controller 102 to the volatile memory 160 to output a reference voltage VSSM to the volatile memory 160. The supply output 103 may be referred to as the power rail for the volatile memory 160 and the reference output 105 may be referred to as the ground rail for the volatile memory 160.

In response to receipt of a signal (sec_vio_in) output from the tamper detection circuit 150 to the power controller 102, wherein the signal is indicative of an attempt to tamper with the volatile memory 160, the power controller 102 is configured to output a reduced supply voltage via the supply output 103 for a first predetermined time period, wherein the reduced supply voltage is less than the first supply voltage VDD. This process may be referred to as power glitching. This forces the SRAM cells to discharge any remnant data faster than known power down techniques, thereby reducing the risk posed by cold boot attacks (or other physical attacks) on a volatile memory 160, as explained in more detail below.

In some embodiments, in response to receipt of the sec_vio_in signal, an increased reference voltage may also be output from the reference output 105 for a second predetermined time period, wherein the increased reference voltage is higher than the first reference voltage VSS but lower than or equal to the first supply voltage VDD. This may improve the speed at which the SRAM cells discharge, thereby providing improved protection against malicious attempts to exploit the data remanence effect of the volatile memory 160.

The second predetermined time period may be less than or equal to the first predetermined time period. In FIG. 1, the first predetermined time period is set by the first timer circuit 104 and the second predetermined time period is set by the second timer circuit 106. This is described in more detail in connection with FIG. 3.

Figure 2:
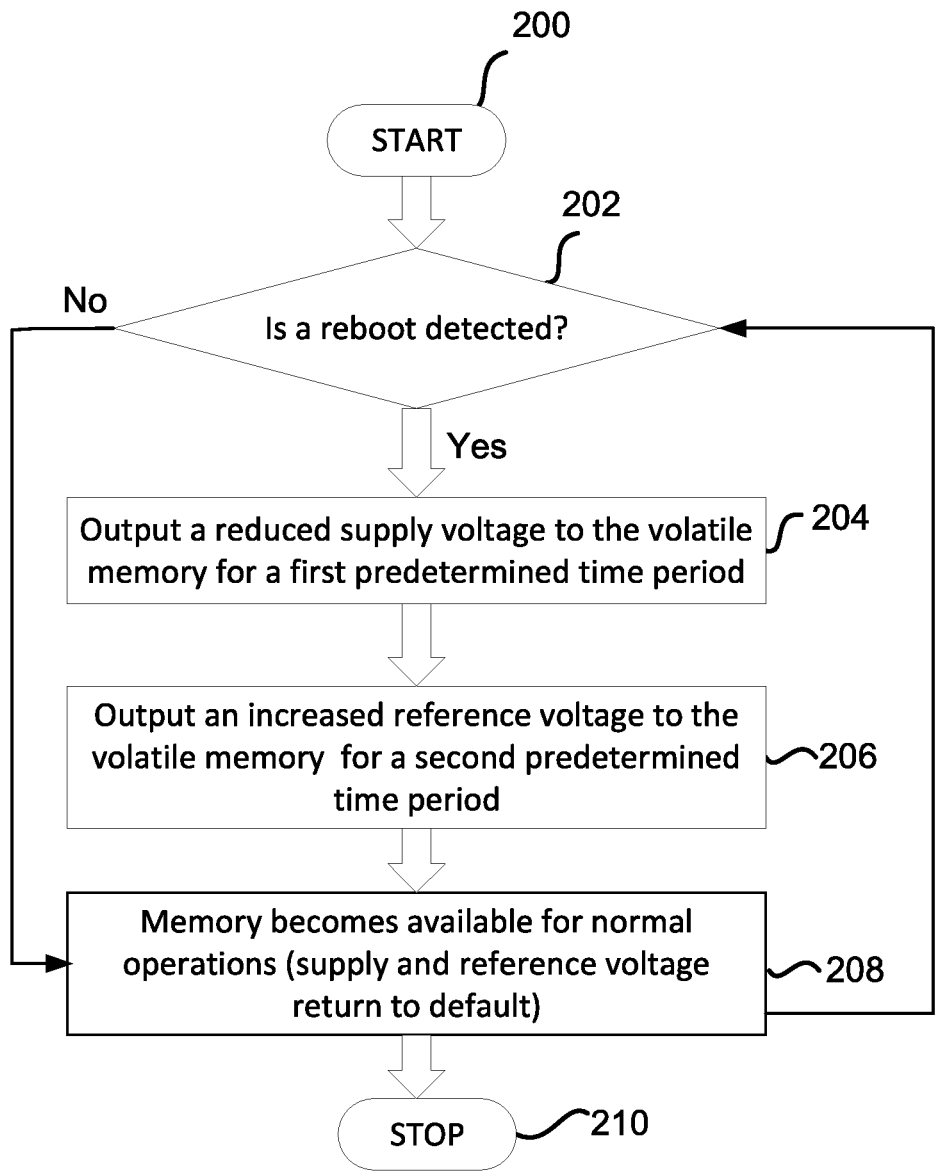
FIG. 2 is a flow chart illustrating a method of preventing unauthorised access to data stored in a volatile memory according to an embodiment of this disclosure.

A method for preventing (or reducing the risk posed by) malicious attempts to exploit the data remanence effect of volatile memory is shown in the flow chart in FIG. 2. The method starts at step 200, during normal use of the electronic device.

At step 202, the method comprises determining if a reboot of the electronic device is detected (by the tamper detection circuit 150, or by a rest controller). It will be appreciated that other types of security violation or tamper detection may be detected.

If no, the method skips to step 208, normal use continues and the tamper detection circuit continues monitoring.

If yes, the method proceeds to step 204. A reduced supply voltage is output to the volatile memory for a first predetermined time period.

Optionally, at step 206 an increased reference voltage is also output to the volatile memory for a second predetermined time period. The second predetermined time period is less than or equal to the first predetermined time period. Steps 204 and 206 can occur simultaneously.

After expiry of the first predetermined time period, the method proceeds to step 208, wherein the supply and reference voltages return to their default values and the volatile memory becomes available for normal operations.

At step 210 the method ends (e.g. when the electronic device is turned off using software).

Figure 3:
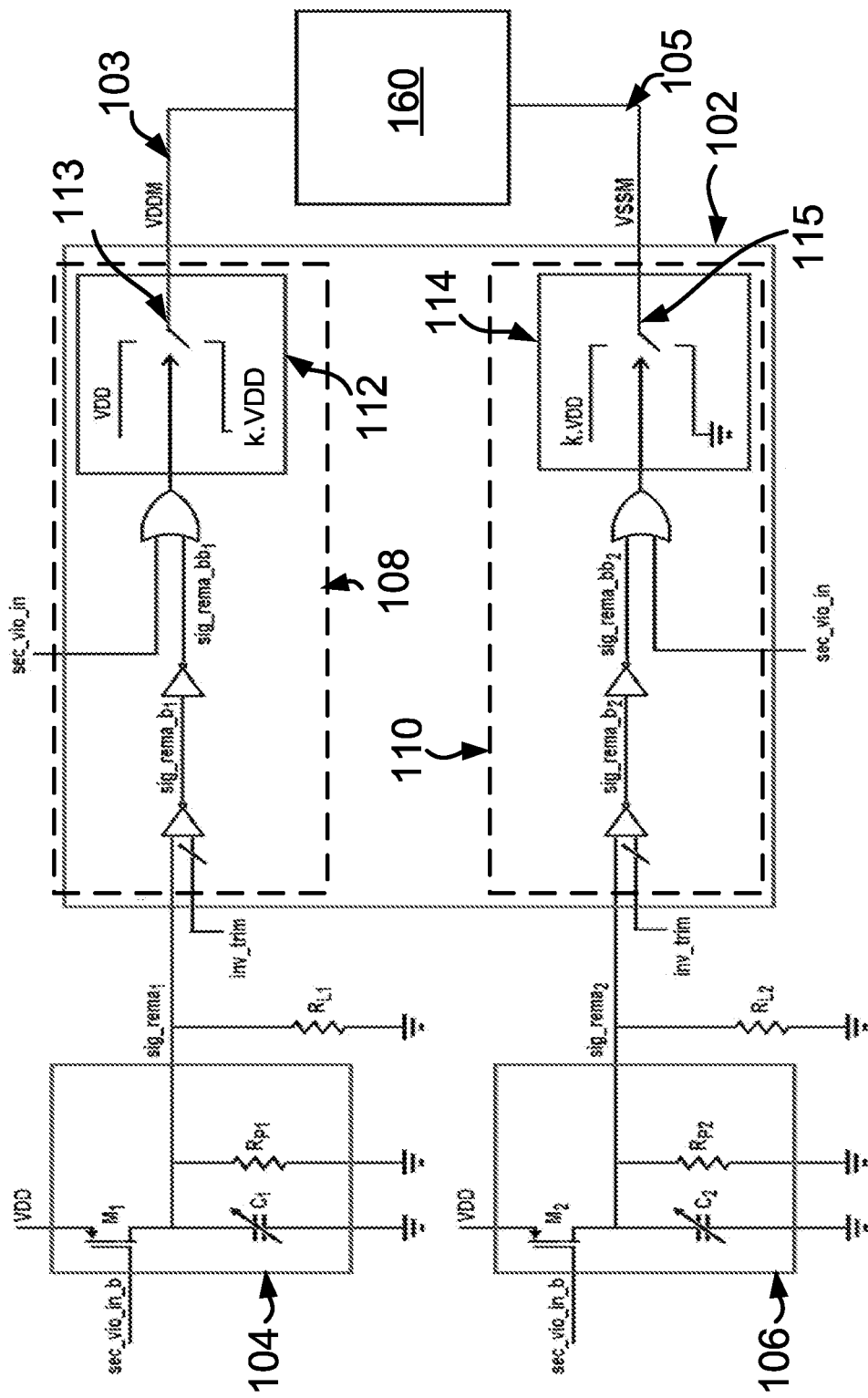
FIG. 3 is a circuit diagram of an embodiment of a MPCU according to an embodiment of this disclosure.
Figure 4:
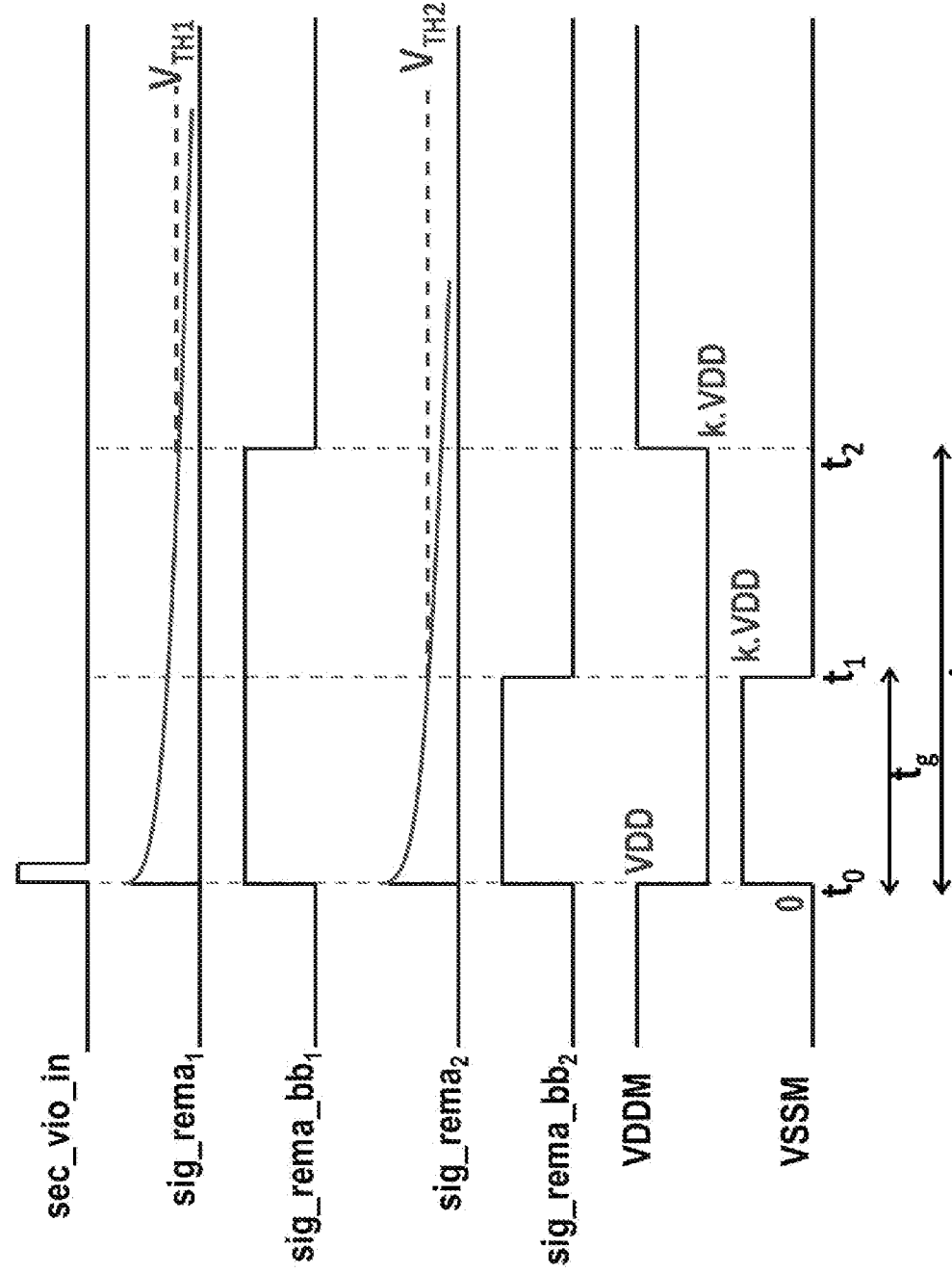
FIG. 4 is a diagram illustrating the outputs and inputs of the MPCU in FIG. 3 and how they vary over time in an embodiment of this disclosure.

FIG. 3 shows a more detailed circuit diagram in an embodiment of the memory power control unit MPCU in FIG. 1. FIG. 4 shows the outputs, inputs and switching periods of the circuit in FIG. 3.

As shown, the first timer circuit 104 and the second timer circuit 106 each comprise an output coupled to the power controller 102 and a first input configured to receive a signal (sec_vio_in_b) from the tamper detection circuit 150. Each timer circuit 104, 106 also comprises a second input configured to receive a charging voltage (in FIG. 3 this is shown as VDD). A transistor, $M_1$ and $M_2$ respectively, is coupled to both the first input and the second input. In this embodiment, $M_1$ and $M_2$ are MOSFET transistors, which may equivalently be referred to as pull-up switches. In other embodiments other kinds of transistor or switching devices may be used. A capacitor, $C_1$ and $C_2$ respectively, is coupled to an output of the transistor in each timer circuit. The capacitors $C_1$ and $C_2$ may be variable or trimmable capacitors. Optionally, each capacitor $C_1$ and $C_2$ may be a capacitor bank comprising a plurality of capacitors.

At the first timer circuit 104 and the second timer circuit 106, if no potential security violation is detected (such as a reboot of the electronic device) the transistors, $M_1$ and $M_2$ are in a first state wherein the capacitors $C_1$ and $C_2$ are not charged. As shown in FIG. 3, in some embodiments a weak-pulldown resistor $R_{P1}$. $R_{P2}$ is coupled between the output of the respective transistor $M_1$. $M_2$ and ground, wherein the resistor is configured to ensure that the capacitor $C_1$ or $C_2$ is not charged during normal operation when the transistor is in the first state. These resistors are not essential, but may improve performance of the circuit.

In response to receipt of a signal (sec_vio_in_b) at the first input indicative of an attempt to tamper with the volatile memory, the $M_1$ transistor is configured to switch to a second state, such that the capacitor $C_1$ is charged by the charging voltage VDD. Similarly, the $M_2$ transistor is configured to switch to a second state, such that the capacitor $C_2$ is charged by the charging voltage VDD. The capacitors $C_1$ and $C_2$ are then rapidly discharged to output a discharge voltage from each of the timer circuits 104, 106 to the power controller (labelled as sig_rema$_1$ and sig_rema$_2$ in FIGS. 3 and 4 respectively). It will be appreciated that this discharge voltage decays over time, as shown in FIG. 4, as is standard with capacitive discharge.

The parasitic leakage resistance of outputs from the timer circuits 104, 106 are modelled in FIG. 3 by lumped resistances $R_{L1}$ and $R_{L2}$.

The power controller 102 comprises a first logic circuit 108 and a second logic circuit 110. In some embodiments, only a single logic circuit may be provided. In the embodiment shown in FIG. 3, each logic circuit 108, 110 comprises combinatorial logics followed by a power supply switch module 112, 114. The combinatorial logics may include, but is not limited to, a low skew inverter followed by an Or gate.

The first power supply switch module 112 comprises a switching device (or switch) 113 which selectively connects the supply output 103 to either the first supply input VDD or a second supply input, wherein the second supply input is configured to receive the reduced supply voltage. In FIG. 3, the second supply input is k. VDD, wherein k has a value between 0 and 1.

The second power supply switch module 114 comprises a switching device (or switch) 115 which selectively connects the reference output 105 to either the first reference input, which in FIG. 3 is ground, or a second reference input. The second reference input is configured to receive an increased reference voltage, which is less than or equal to the first supply voltage VDD. In FIG. 3 the increased reference voltage is k·VDD, wherein k has a value between 0 and 1. It will be appreciated that if k is 0 no increased reference voltage is output if the first reference voltage was also 0 V, which is within the scope of the present disclosure.

The reduced supply voltage and/or the increased reference voltage may be provided by an external power supply that does not form part of the power controller (not shown). Alternatively, in some embodiments the reduced supply voltage and/or the increased reference voltage may be supplied by the power controller itself.

During normal operation (i.e. no security violation the first switching device 113 couples the first supply input (VDD) to the supply output 103 and the second switching device 115 couples the first reference input (VSS) to the reference output 105.

In response to receipt of a signal indicative of an attempt to tamper with the volatile memory at to, the first logic circuit 108 receives the discharge voltage output by the first timer circuit 104. The first logic circuit 108 compares this discharge voltage (sig_rema$_1$) to a first predetermined threshold, $V_{TH1}$, as shown in FIG. 4. This comparison may be done, for example, using the low skewed inverter shown in FIG. 3. For the duration that the discharge voltage (sig_rema$_1$) exceeds the first predetermined threshold $V_{TH1}$, a logic state of 1 is output from the low skewed inverter (sig_rema_bb1 is 1). This duration is referred to as the first predetermined time period, labelled as $t_s$ in FIG. 4.

It will be appreciated that the higher the discharge voltage from $C_1$ and the lower the first predetermined threshold is, the longer the first predetermined time period will be. This can be set depending on the system properties of the electronic device and the volatile memory 160. Typically, the first predetermined time period is of the order of microseconds or lower.

When the discharge voltage (sig_rema$_1$) is less than (or less than or equal to) the first predetermined threshold $V_{TH1}$, a logic state of 0 is output from the low skewed inverter (sig_rema_bb1 is 0). This logic state (sig_rema_bb1) is received by the Or gate in the first logic circuit 108.

The Or gate also receives an input from the tamper detection circuit 150, wherein the signal (sec_vio_in) may be 1 if a potential security violation (e.g. reboot) is detected, and 0 if no security violation is detected.

When any of the inputs (sec_vio_in=1 or sig_rema_bb1=1) is high, the combinatorial logic output of the Or gate is high. The Or gate then outputs a signal which switches the switching device 113 to couple the supply output 103 or VDDM to the second supply input to output the reduced supply voltage (in FIG. 3 and FIG. 4 this reduced supply voltage is k. VDD, where 0≤k≤1) to the volatile memory 160.

When both of the inputs (sec_vio_in=0 and sig_rema_bb1=0) are low, the combinatorial logic output of the Or gate is low. The Or gate then outputs a signal which switches the switching device 113 to couple the supply output 103 to the first supply input to output the first supply voltage VDD to the volatile memory 160.

The equivalent operational process can apply to the second logic circuit 110. In response to receipt of a signal indicative of an attempt to tamper with the volatile memory at $t_0$, the second logic circuit 110 receives the discharge voltage output by the second timer circuit 106. The second logic circuit 110 compares this discharge voltage (sig_rema$_2$) to a second predetermined threshold, $V_{TH2}$, as shown in FIG. 4. For the duration that the discharge voltage (sig_rema$_2$) exceeds the second predetermined threshold $V_{TH2}$, a logic state of 1 is output from the low skewed inverter (sig_rema_bb2 is 1). This duration is referred to as the second predetermined time period, which is labelled as $t_g$ in FIG. 4. It will be appreciated that the higher the discharge voltage from $C_2$ and the lower the second predetermined threshold $V_{TH2}$ is, the longer the second predetermined time period will be. This can be set depending on the system properties of the electronic device and the volatile memory 160.

The second predetermined threshold $V_{TH2}$ is greater than or equal to the first predetermined threshold $V_{TH1}$. The second predetermined time period $t_g$ is less than or equal to the first predetermined time period $t_s$. Typically, the second predetermined time period is also of the order of microseconds or lower.

As shown in FIG. 4, the discharge voltage (sig_rema$_2$) will be decreasing over time. Therefore, when the discharge voltage (sig_rema$_2$) is less than (or less than or equal to) the second predetermined threshold $V_{TH2}$ in FIG. 4, a logic state of 0 is output from the low skewed inverter (sig_rema_bb2 is 0). This logic state (sig_rema_bb2) is received by the Or gate in the first logic circuit 108.

The Or gate also receives an input from the tamper detection circuit 150, wherein the signal (sec_vio_in) may be 1 if a potential security violation (e.g. reboot) is detected, and 0 if no security violation is detected.

When any of the inputs (sec_vio_in=1 or sig_rema_bb2=1) is high, the combinatorial logic output of the Or gate is high. The Or gate then outputs a signal which switches the switching device 115 to couple the reference output 105 or VSSM to the second reference input to output the increased reference voltage (in FIGS. 4 and 5 this increased reference voltage is k. VDD, where 0≤k≤1) to the volatile memory 160.

When both of the inputs (sec_vio_in=0 and sig_rema_bb2=0) are low, the combinatorial logic output of the Or gate is low. The Or gate then outputs a signal which switches the switching device 115 to couple the reference output 105 to the first reference input to output the first reference voltage (shown as ground or 0V in FIGS. 3 and 4) to the volatile memory 160.

It will be appreciated that the values of 1 and 0 (high or low) described above could equally be reversed.

Although the specific timer circuits and logic circuits have been shown in FIG. 3, it will be appreciated that the present disclosure is not limited to this embodiment. Indeed, there are a variety of different circuits that could be used to output a reduced supply voltage, or a reduced supply voltage and an increased reference voltage, for a set period of time. In one non-limiting example not shown in the figures, one or more components such a transistors, capacitors or resistors, could be controlled for a predetermined amount of time, to reduce the supply voltage output.

Figure 5:
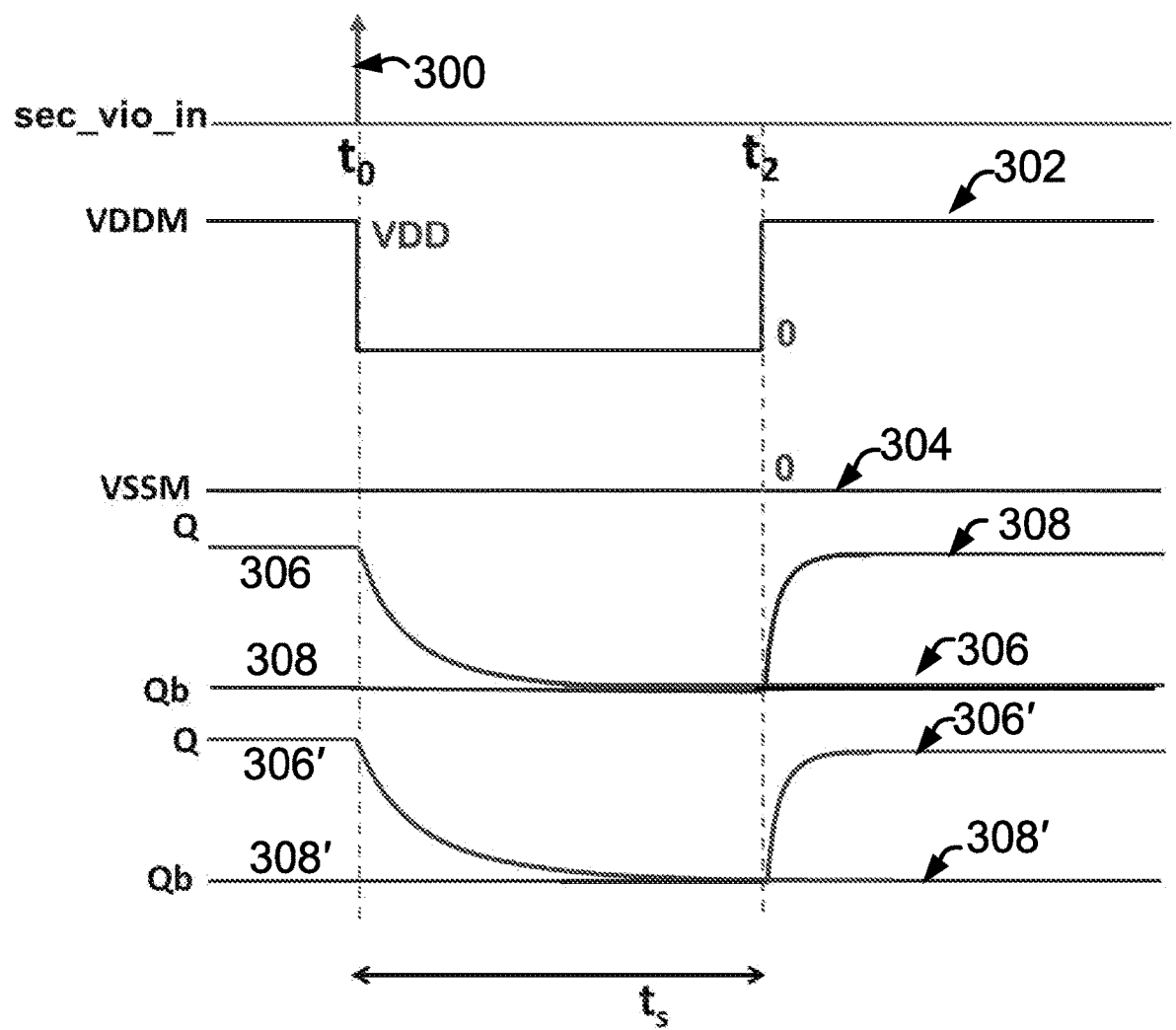
FIG. 5 is a diagram illustrating how the MPCU can be used to affect an SRAM bit-cell in an embodiment of this disclosure.

FIG. 5 is a diagram illustrating how the MPCU can be used to reduce the risk of exploitation of the data remanence effect in an SRAM bit-cell, according to an embodiment of this disclosure.

In FIG. 5, the x-axis is time. The first trace shows the sec_vio_in signal from the tamper detection circuit 150. The VDDM trace labelled 302 is the supply voltage output to the volatile memory. The VSSM trace labelled 304 is the reference voltage output to the volatile memory. Q and Qb are the two outputs of an SRAM cell, for example as shown on the example SRAM cell 600 in FIG. 8. One of these outputs will be high and the other output will be low. It will be appreciated that the present disclosure is not limited to SRAM, as the MPCU 100 can be used in combination with any type of volatile memory.

At a time $t_0$ the MPCU 100 receives a signal indicative of a reboot of the electronic device (or other potential security violation), such as sec_vio_in=1. This is labelled as 300 in FIG. 5. Accordingly, at time $t_0$ the MPCU 100 reduces VDDM, from VDD (the first or default supply input) to 0 V until time $t_2$. The time period from $t_0$ to $t_2$ is the first predetermined time period, with is labelled as $t_s$ in FIG. 5. Normal usage and operation of the volatile memory can resume after time $t_2$ In this embodiment, there is no change to the reference voltage output 304 to the volatile memory, VSSM, as this remains as ground (0 V). This embodiment may be particularly useful for process technology without a Deep N-Well (DNW) layer.

The reduction of the supply voltage to 0 V for the first predetermined time period causes the SRAM cell outputs Q and Qb to deplete any remnant charge. This is shown in FIG. 5, as both SRAM cell outputs Q and Qb decay to 0 V during the first predetermined time period $t_s$. This prevents hackers exploiting the data remanence effect of SRAM cells, even in a cold boot attack.

In a first case where there is a weaker pull up for Q, the Q output 306 is low after the first predetermined time period $t_s$ and the Qb output 308 is high. In a second case where there is a stronger pull down for Q, the Q output 306' is high after the first predetermined time period $t_s$ and the Qb output 308' is low.

Figure 6:
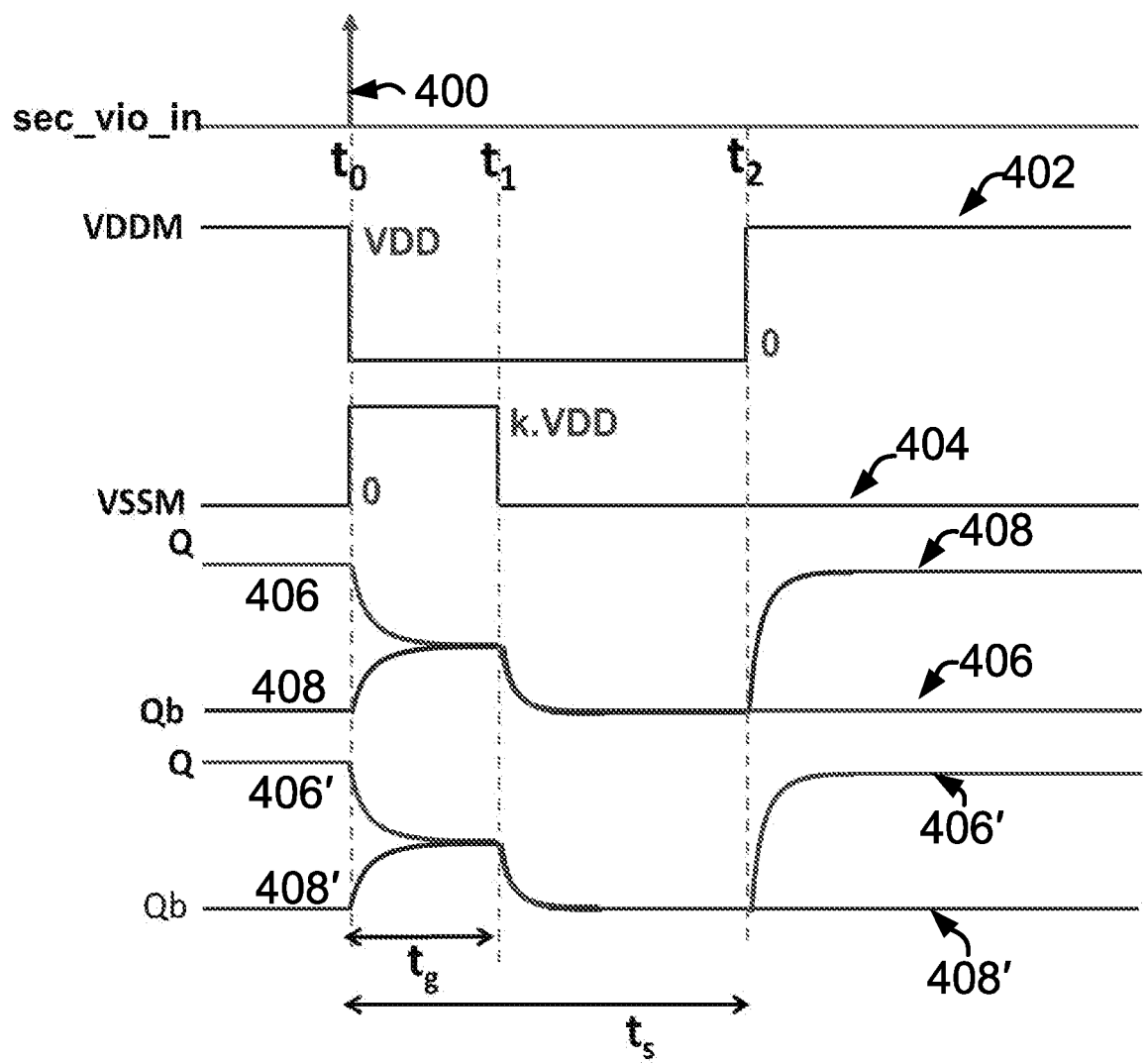
FIG. 6 is a diagram illustrating how the MPCU can be used to affect an SRAM bit-cell according to another embodiment of this disclosure.
Figure 7:
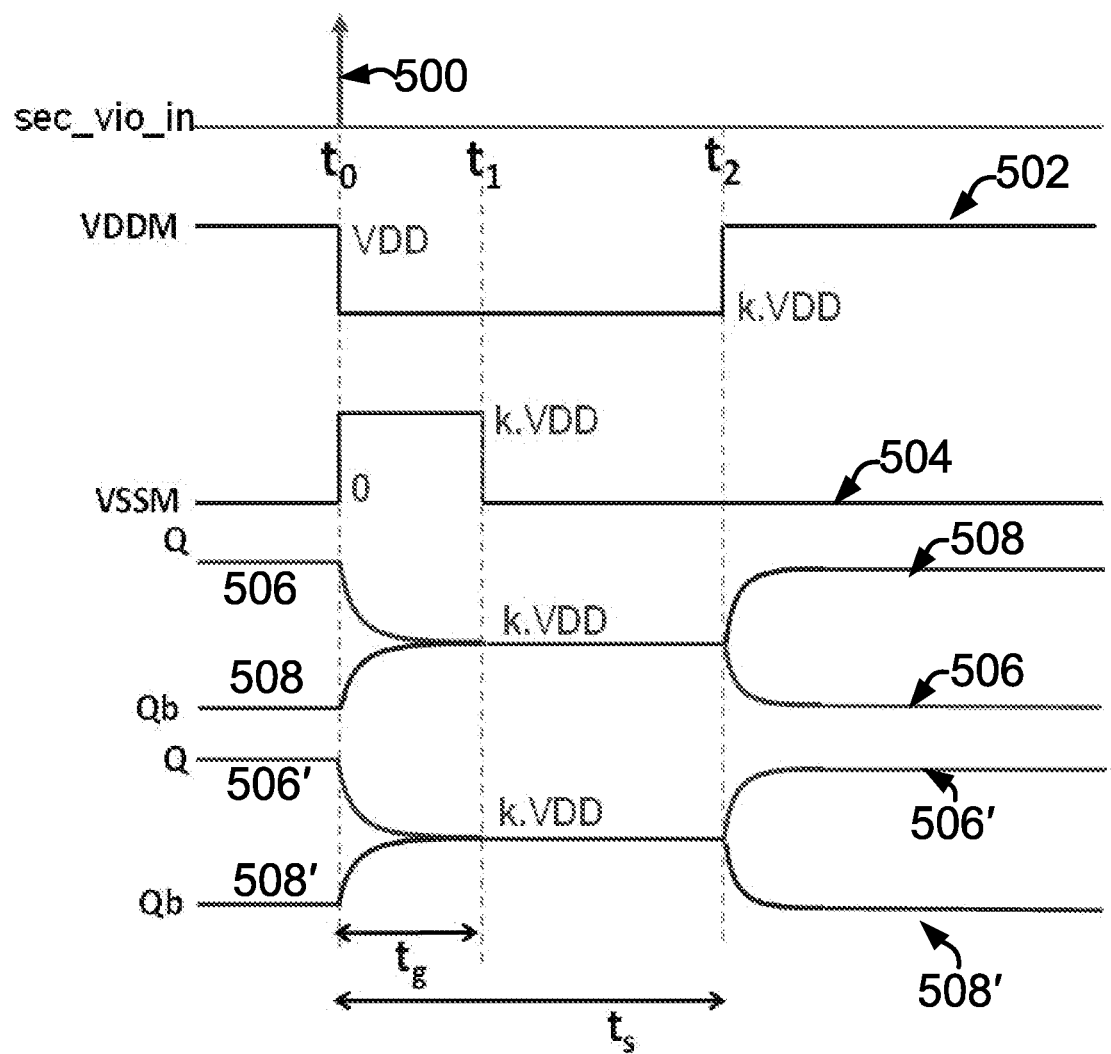
FIG. 7 is a diagram illustrating how the MPCU can be used to affect an SRAM bit-cell according to another embodiment of this disclosure.

Further embodiments are shown in FIGS. 6 and 7, wherein features that are common between FIGS. 5, 6 and 7 have been labelled accordingly.

In FIG. 6, at a time $t_0$ the MPCU 100 receives a signal indicative of a reboot of the electronic device (or other potential security violation), such as sec_vio_in=1. This is labelled as 400 in FIG. 6. At time $t_0$ the MPCU 100 reduces the supply voltage output to the volatile memory, VDDM or 402, from to 0 V until time $t_2$, as in FIG. 4.

In addition, at time at $t_0$ the MPCU 100 increases the reference voltage output to the volatile memory, VSSM or 404, from 0 V to k. VDD until time $t_1$, wherein k is between 0 and 1. The time period from $t_0$ to $t_1$ is the second predetermined time period, with is labelled as $t_g$ in FIG. 6.

The reduction of the supply voltage to 0 V for the first predetermined time period, coupled with the increase of the reference voltage to k. VDD for the second predetermined time period causes the SRAM cell outputs Q and Qb to deplete any remnant charge even quicker than if only the supply voltage is changed. This prevents hackers exploiting the data remanence effect of SRAM cells, even in a cold boot attack. This is shown by a comparison of FIG. 5 and FIG. 6, as in FIG. 6 both SRAM cell outputs Q and Qb converge to a common voltage within the second predetermined time period $t_g$, and then decay to 0 V during the first predetermined time period $t_s$. A higher value of k results in a faster discharge, thus the fastest discharge is achieved in this embodiment when k=1.

In a first case where there is a weaker pull up for Q, the Q output 406 is low after the first predetermined time period $t_s$ and the Qb output 408 is high. In a second case where there is a stronger pull down for Q, the Q output 406' is high after the first predetermined time period $t_s$ and the Qb output 408' is low.

A further embodiment is shown in FIG. 7. Again, at a time $t_0$ the MPCU 100 receives a signal indicative of a reboot of the electronic device (or other potential security violation), such as sec_vio_in=1. This is labelled as 500 in FIG. 7.

At time $t_0$ the MPCU 100 reduces the supply output voltage, VDDM or 502, from VDD to k. VDD until time $t_2$, wherein k is between 0 and 1. The value of k can be selected by user based on technology and reliability.

Also at time $t_0$ the MPCU 100 elevates the reference voltage output to the volatile memory, VSSM or 504, from ground to k. VDD until time $t_1$, where $t_1$ is less than $t_2$. The time period from $t_0$ to $t_1$ is the second predetermined time period, with is labelled as $t_g$ in FIG. 7. It will be appreciated that in some examples, $t_g$ and $t_s$ may be the same. Also, although in FIG. 7 VDDM and VSSM are modified to be the same voltage k. VDD, in other examples different values of k may be used for the supply voltage and the reference voltage.

The depletion of any remnant charge in the SRAM cells occurs quicker in FIG. 7 than in FIG. 5, as is shown by the discharge of the Q and Qb outputs. In FIG. 7, both outputs Q and Qb converge on the common voltage k·VDD during the second predetermined time period $t_g$, which prevents exploitation of the data remanence effect. At time $t_2$ when the power glitching ends, either output may be high.

In a first case where there is a weaker pull up for Q, the Q output 506 is low after the first predetermined time period $t_s$ and the Qb output 508 is high. In a second case where there is a stronger pull down for Q, the Q output 506' is high after the first predetermined time period $t_s$ and the Qb output 508' is low.

Accordingly, there has been described a memory power control unit, MPCU, for preventing unauthorised access to data stored in a volatile memory. The MPCU comprising a power controller comprising an input configured to receive a signal from a tamper detection circuit, a first supply input configured to receive a first supply voltage, a first reference input configured to receive a first reference voltage, a supply output configured to output a supply voltage to the volatile memory, a reference output configured to output a reference voltage to the volatile memory, wherein, in response to receipt of a signal at the input indicative of an attempt to tamper with the volatile memory, the power controller is configured to output a reduced supply voltage via the supply output for a first predetermined time period, wherein the reduced supply voltage is less than the first supply voltage.

Thus, the present disclosure provides a hardware solution in the form of a memory power control unit that reduces (or eliminates) data remanence security vulnerabilities in a volatile memory array.

Advantageously, the solution to the data remanence problem proposed by the present disclosure is transparent to software. Software cannot modify the operation of the MPCU to allow a data remanence attack (e.g. cold boot attack).

The proposed memory power glitch time (i.e. the first predetermined period) which is typically of the order of microseconds (or lower), is substantially smaller than nominal data remanence period (in order of seconds or hundreds of milli seconds). Thus, the technique can be implemented as a default part of system boot sequence if the system turns on below a certain temperature and eliminate the scope of cold boot attack The MPCU and operation process is scalable for any size (small or large) of volatile memory (such as SRAMs/DRAMs/any other type of volatile memory) and applicable for both legacy and modern RAMs.

Finally, the MPCU requires modest area and negligible power overhead, which makes this a relatively cost effective and convenient solution.

Although particular embodiments of this disclosure have been described, it will be appreciated that many modifications/additions and/or substitutions may be made within the scope of the claims.

We claim:

1. A memory power control unit, MPCU, for preventing unauthorised access to data stored in a volatile memory, the MPCU comprising:
   a power controller comprising:
      an input configured to receive a signal from a tamper detection circuit;
      a first supply input configured to receive a first supply voltage;
      a first reference input configured to receive a first reference voltage;
      a supply output configured to output a supply voltage to the volatile memory;
      a reference output configured to output a reference voltage to the volatile memory;
   wherein, in response to receipt of a signal at the input indicative of an attempt to tamper with the volatile memory, the power controller is configured to output a reduced supply voltage via the supply output for a first predetermined time period, wherein the reduced supply voltage is less than the first supply voltage, wherein the power controller comprises a switching device, wherein the switching device is configured to selectively connect the supply output to either the first supply input or a second supply input, wherein the second supply input is configured to receive the reduced supply voltage.

2. The memory power control unit of claim 1, further comprising;
   a timer circuit, wherein the timer circuit is configured to set the first predetermined time period.

3. The memory power control unit of claim 2, wherein:
   the timer circuit comprises a capacitor; and
   the power controller comprises a logic circuit;

wherein, in response to receipt of a signal indicative of an attempt to tamper with the volatile memory:
the timer circuit is configured to output a discharge voltage from the capacitor; and
the logic circuit is configured to compare the discharge voltage to a predetermined threshold, wherein the logic circuit is configured to provide the reduced supply voltage to the supply output until the discharge voltage reaches the predetermined threshold.

4. The memory power control unit of claim 2, wherein the timer circuit comprises:
a first input configured to receive a signal from the tamper detection circuit;
a second input configured to receive a charging voltage;
a transistor coupled to both the first input and the second input, wherein the capacitor is coupled to an output of the transistor; and
an output;
wherein, in response to receipt of a signal at the first input indicative of an attempt to tamper with the volatile memory, the transistor is configured to charge and then discharge the capacitor to provide the discharge voltage to the output.

5. The memory power control unit of claim 1, wherein, in response to receipt of a signal at the input indicative of an attempt to tamper with the volatile memory, the power controller is configured to output an increased reference voltage via the reference output for a second predetermined time period, wherein the increased reference voltage is higher than the first reference voltage but less than or equal to the first supply voltage.

6. The memory power control unit of claim 5, wherein the first predetermined time period is greater than or equal to the second predetermined time period.

7. The memory power control unit of claim 5, further comprising;
a timer circuit, wherein the timer circuit is configured to set the first predetermined time period and the second predetermined time period.

8. The memory power control unit of claim 7, wherein:
the timer circuit comprises a capacitor; and
the power controller comprises a logic circuit;
wherein, in response to receipt of a signal indicative of an attempt to tamper with the volatile memory:
the timer circuit is configured to output a discharge voltage from the capacitor; and
the logic circuit is configured to:
compare the discharge voltage to a first predetermined threshold, wherein the logic circuit is configured to provide the reduced supply voltage to the supply output until the discharge voltage reaches the first predetermined threshold; and
compare the discharge voltage to a second predetermined threshold, wherein the logic circuit is configured to provide the increased reference voltage to the reference output until the discharge voltage reaches the second predetermined limit, wherein the second predetermined threshold is greater than or equal to the first predetermined threshold.

9. The memory power control unit of claim 8, wherein the logic circuit comprises at least one switching device, wherein the at least one switching device is configured to selectively connect:
the supply output to either the first supply input or a second supply input, wherein the second supply input is configured to receive the reduced supply voltage; and
the reference output to either the first reference input or a second reference input, wherein the second reference input is configured to receive the increased reference voltage.

10. The memory power control unit of claim 5, further comprising:
a first timer circuit configured to set the first predetermined time period; and
a second timer circuit configured to set the second predetermined time period.

11. The memory power control unit of claim 10, wherein:
the power controller comprises a first logic circuit coupled to the first timer circuit, and a second logic circuit coupled to the second timer circuit; and
each timer circuit comprises a respective capacitor;
wherein, in response to receipt of a signal indicative of an attempt to tamper with the volatile memory:
each timer circuit is configured to output a discharge voltage from the respective capacitor; and
the respective logic circuit is configured to receive the discharge voltage from the respective timer circuit; and
until the discharge voltage from the first timer circuit reaches a first predetermined threshold, the first logic circuit is configured to provide the reduced supply voltage to the supply output; and
until the discharge voltage from the second timer circuit reaches a second predetermined threshold, the second logic circuit is configured to provide the increased reference voltage to the reference output.

12. The memory power control unit of claim 11, wherein:
the first logic circuit comprises a first switching device, the first switching device configured to selectively connect the supply output to either the first supply input or a second supply input, wherein the second supply input is configured to receive the reduced supply voltage; and
the second logic circuit comprises a second switching device, the second switching device configured to selectively connect the reference output to either the first reference input or a second reference input, wherein the second reference input is configured to receive the increased reference voltage.

13. The memory power control unit of claim 11, wherein each timer circuit comprises:
a first input configured to receive a signal from the tamper detection circuit;
a second input configured to receive a charging voltage;
a transistor coupled to both the first input and the second input, wherein the capacitor is coupled to an output of the transistor; and
an output;
wherein, in response to receipt of a signal at the first input indicative of an attempt to tamper with the volatile memory, the transistor is configured to charge and then discharge the capacitor to provide the discharge voltage to the output.

14. The memory power control unit of claim 13, wherein each timer circuit further comprises:
a resistor coupled between the output of the transistor and ground, wherein the resistor is configured to ensure that the capacitor remains in an uncharged state until the first input receives a signal indicative of an attempt to tamper with the volatile memory.

15. The memory power control unit of claim 1, wherein the first predetermined time period is of the order of microseconds or lower.

16. An electronic device comprising:
a power controller comprising:
  an input configured to receive a signal from a tamper detection circuit;
  a first supply input configured to receive a first supply voltage;
  a first reference input configured to receive a first reference voltage;
  a supply output configured to output a supply voltage to the volatile memory;
  a reference output configured to output a reference voltage to the volatile memory;
  wherein, in response to receipt of a signal at the input indicative of an attempt to tamper with the volatile memory, the power controller is configured to output a reduced supply voltage via the supply output for a first predetermined time period, wherein the reduced supply voltage is less than the first supply voltage;
a volatile memory coupled to both the supply output and the reference output of the memory power control unit; and
a tamper detection circuit coupled to the input of the memory power control unit, wherein the tamper detection circuit is configured to:
  detect a reboot of the electronic device; and
  output a signal indicative of an attempt to tamper with the volatile memory in response to detecting a reboot of the electronic device;
wherein the power controller comprises a switching device, wherein the switching device is configured to selectively connect the supply output to either the first supply input or a second supply input, wherein the second supply input is configured to receive the reduced supply voltage.

17. A method of preventing unauthorised access to data stored in a volatile memory, the method comprising:
providing a power controller, the power controller comprising:
  an input;
  a first supply input configured to receive a first supply voltage;
  a first reference input configured to receive a first reference voltage;
  a supply output configured to output a supply voltage to the volatile memory;
  a reference output configured to output a reference voltage to the volatile memory;
receiving, at the input of the power controller, a signal indicative of an attempt to tamper with the volatile memory; and
outputting for a first predetermined time period a reduced supply voltage via the supply output, wherein the reduced supply voltage is less than the first supply voltage, wherein in response to receipt of a signal at the input indicative of an attempt to tamper with the volatile memory, the method further comprises:
outputting an increased reference voltage via the reference output for a second predetermined time period, wherein the increased reference voltage is higher than the first reference voltage but less than or equal to the first supply voltage.

18. The method of claim 17, wherein the first predetermined time period is greater than or equal to the second predetermined time period.

* * * * *